United States Patent
Erickson et al.

(10) Patent No.: US 10,469,018 B2
(45) Date of Patent: Nov. 5, 2019

(54) POWER MODULATING MOTOR CONTROL METHOD

(71) Applicant: Blount, Inc., Portland, OR (US)

(72) Inventors: Noah Erickson, Portland, OR (US);
Stephen Jones, Portland, OR (US);
Jonathan Ziring, Portland, OR (US)

(73) Assignee: BLOUNT, INC., Portland, OR (US)

( * ) Notice: Subject to any disclaimer, the term of this patent is extended or adjusted under 35 U.S.C. 154(b) by 0 days.

(21) Appl. No.: 15/968,730

(22) Filed: May 1, 2018

(65) Prior Publication Data

US 2018/0358918 A1    Dec. 13, 2018

Related U.S. Application Data

(60) Provisional application No. 62/500,958, filed on May 3, 2017.

(51) Int. Cl.
| | |
|---|---|
| *H02P 29/40* | (2016.01) |
| *A01G 3/037* | (2006.01) |
| *A01G 3/053* | (2006.01) |
| *A01G 3/06* | (2006.01) |
| *H02P 29/02* | (2016.01) |
| *H02P 29/032* | (2016.01) |
| *B25F 5/00* | (2006.01) |

(Continued)

(52) U.S. Cl.
CPC .............. *H02P 29/40* (2016.02); *A01G 3/037* (2013.01); *A01G 3/053* (2013.01); *A01G 3/062* (2013.01); *B25F 5/00* (2013.01); *H02P 29/02* (2013.01); *H02P 29/032* (2016.02); *A01D 34/416* (2013.01); *A01D 34/84* (2013.01); *B27B 17/08* (2013.01)

(58) Field of Classification Search
CPC ........................................................ H02P 29/40
USPC ........................................................ 318/17, 34
See application file for complete search history.

(56) References Cited

U.S. PATENT DOCUMENTS

| | | | | |
|---|---|---|---|---|
| 5,666,463 | A * | 9/1997 | Schwartz | H02M 1/32 |
| | | | | 318/400.17 |
| 7,023,159 | B2 * | 4/2006 | Gorti | H02P 3/12 |
| | | | | 318/139 |

(Continued)

FOREIGN PATENT DOCUMENTS

| | | |
|---|---|---|
| CN | 206211869 U | 5/2017 |
| EP | 2338325 A1 | 6/2011 |

(Continued)

*Primary Examiner* — David Luo
(74) *Attorney, Agent, or Firm* — Schwabe Williamson & Wyatt, P.C.

(57) ABSTRACT

A electric power tool, comprising a control system electrically coupled to a power supply and a motor to supply current to the motor, where the motor may be coupled to a driven element of a tool so as to drive the driven element. The control system may have a continuous power mode and a boost power mode to supply current to the motor at a greater amount than in continuous power mode, and may be configured to switch between the continuous power mode and the boost power mode based upon a sensed load on the electric motor. In some embodiments, the control system may switch to a cutback power mode to supply current to the motor at a lower amount than in continuous power mode is the load does not decrease before a predetermined time elapses.

15 Claims, 3 Drawing Sheets

(51) Int. Cl.
*A01D 34/416* (2006.01)
*A01D 34/84* (2006.01)
*B27B 17/08* (2006.01)

(56) References Cited

U.S. PATENT DOCUMENTS

| | | | |
|---|---|---|---|
| 8,076,873 B1 * | 12/2011 | Lucas | H02P 1/54 |
| | | | 318/107 |
| 9,543,871 B2 * | 1/2017 | Kato | H02P 27/08 |
| 2013/0020102 A1 | 1/2013 | Bjornlinger | |

FOREIGN PATENT DOCUMENTS

| | | |
|---|---|---|
| EP | 2685627 A2 | 1/2014 |
| JP | 2012157363 A | 8/2012 |

* cited by examiner

POWER MODULATING MOTOR CONTROL METHOD

CROSS-REFERENCE TO RELATED APPLICATION

This application claims the priority benefit of the earlier filing date of U.S. Provisional Application No. 62/500,958, filed May 3, 2017, which is hereby incorporated herein by reference in its entirety.

TECHNICAL FIELD

Embodiments herein relate to the field of electric tools, and, more specifically, to devices, methods, and systems for electric motors to automatically adjust their power output in response to load.

BACKGROUND

Hand held electric power tools, such as string trimmers, hedge trimmers, chain saws, and pole saws, include an electric motor. Using a hedge trimmer as an example, these tools are ideal for cutting large areas of thin branches and stems. However when encountering larger branches, the electric motor of the hedge trimmer may experience a stall as the larger branches become lodged in the cutting blades of the hedge trimmer.

BRIEF DESCRIPTION OF THE DRAWINGS

Embodiments will be readily understood by the following detailed description in conjunction with the accompanying drawings and the appended claims. Embodiments are illustrated by way of example and not by way of limitation in the figures of the accompanying drawings.

DETAILED DESCRIPTION OF DISCLOSED EMBODIMENTS

Figure 1:
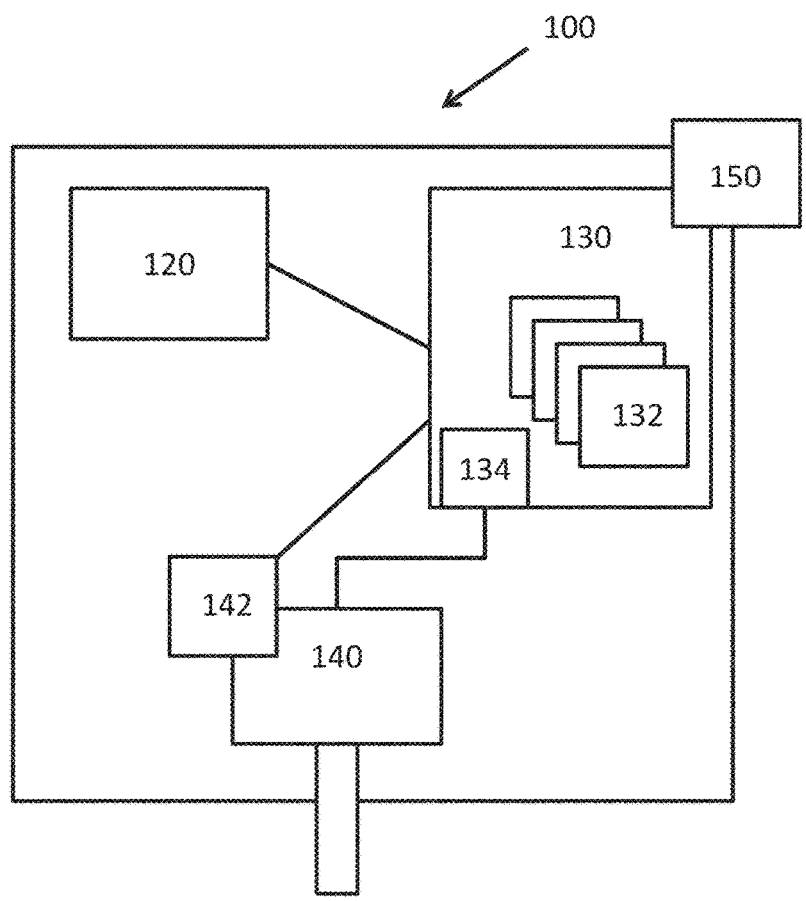
FIG. 1 is a schematic of an electric power tool including an exemplary control system, in accordance with various embodiments.

In the following detailed description, reference is made to the accompanying drawings, which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

Electric tools that may implement embodiments disclosed herein, such as A/C or battery operated power tools, typically include a power supply, such as power cord or a battery, an electric motor controlled by a control system, and a driven element such as a blade, driven by the electric motor. They are typically lighter and quieter than their gas powered counterparts and are thus widely used by the home consumer. More recently, the electric versions of handheld landscaping and/or arborist tools are being adopted by commercial users. One of the hurdles facing their adoption is the peak power output that may be needed in commercial operations, such as commercial landscaping operations.

As used herein, "power" may be understood by its accepted electrical definition of voltage times current. Accordingly, for a given tool voltage, e.g. 18-60 VDC for many cordless battery-operated tools, increasing power for a given voltage results in increased current. To the extent that "power" and "current" are used interchangeably herein, it should be understood that the terms are expressed with respect to a given reference voltage, so that increasing power directly correlates to an increasing current.

The electronic components of the electric tools, commonly including batteries or power supplies, motors, motor controllers, switches, and conductors such as wires or leads, have limits to the amount of power that each can continuously deliver. Electric current flowing through a component typically generates heat, with the amount of heat generated in a component corresponding to the amount of current flowing through the component. Accordingly, increasing power increases the current through a component (assuming the operating voltage remains approximately constant), which can result in a corresponding increase in the amount of heat generated by the component. To avoid component damage and/or failure, this heat must be dissipated prior to reaching the component's thermal limits. Because a given component may have a limit on the amount of heat that it can dissipate continuously, this continuous dissipation limit effectively determines the component's continuous current limit, and by extension, continuous power limit.

It may be understood from the foregoing that passing a current through a component that exceeds its continuous current limit may result in heat being generated faster than can be dissipated. This in turn may result in component temperature rising and, if the excess current does not abate in time, the component exceeding its thermal limits. It may further be understood that the greater the current excursion above the component's continuous current limit, the faster the component temperature will rise.

A given tool may present a chain of electrical components, such as a battery or power supply, which feeds to a controller, which in turn may pass some current through a trigger or actuator and/or may control or pass current through a motor. Conductors such as leads or wires, themselves components, may tie these components together. Each component may have its own continuous current limit that may differ from other components. As each component may impact the amount of current flowing through other components, the entire chain of electrical components may be considered to have a system continuous current limit. This system continuous current limit may also be characterized as a system thermal limit (also simply referred to as a "system thermal").

To safeguard against damage, modern electric tools may be equipped with control electronics that limit the amount of continuous power that the tool delivers to ensure the controlled electronic components stay within the system thermal limit. In the context a motor-driven electric tool or implement, the amount of power required, and thus current draw, by an electric motor increases with motor load. A severe overload, such as a jammed tool, may result in a complete motor stall. A motor stall can effectively act as a short circuit, drawing relatively immense amounts of current through the motor and associated components and potentially causing damage within a matter of seconds. Thus, the control electronics may be configured to detect a motor stall, such as may occur if a tool is jammed, e.g., when a hedge trimmer is unable to cut through a thick branch, or a chainsaw binds while sawing a log. The resulting partially severed branch or pinched kerf may prevent further movement of the trimmer bar or saw chain, respectively, and consequently, the mechanically linked motor. The control electronics, such as an electronic speed controller (ESC), may be configured to detect dramatic spikes in current draw indicative of a motor stall, and completely shut current flow to prevent damage to the ESC and motor.

As may be appreciated from the foregoing discussion, electronic components may be able to handle power levels that exceed the continuous current limit provided the higher power and associated excess heat build-up is discontinued prior to damage occurring. The duration of such higher power levels can depend upon the extent to which the power exceeds the continuous current limit, along with the thermal limits of the components in question. Bursts of such higher power levels, so long as discontinued before system thermal limits are reached, may be useful in electric tools for helping to power through jobs where occasional transient high loads occur that may otherwise cause the tool to stall if only operated at a power level at or below the continuous current limit. For example, a tool may have a continuous current limit in the 5 to 50 amp range, with the tool components designed to handle these currents continuously during operation. The tool may further be able to handle bursts of current from 20% to 200% above the continuous current limit for 10 seconds (with a burst closer to 20% over continuous) to 100 milliseconds (when the burst approaches 200% over continuous) without significantly impacting system thermal limits.

Thus, disclosed are embodiments, systems such as electronic control systems, and devices incorporating the same that assess the entire system of an electric tool to determine how much excess power capacity or headroom is available. If sufficient power headroom is available, the control system can route power in excess of the continuous current limit to an electric motor, for example to overcome a potential stall situation presented by a transient load. The control system determines the presence of power headroom by testing whether the system thermals will allow for such a brief "boost" of additional power. If the thermal parameters are within acceptable ranges, the control system provides the additional current for a controlled period of time. In embodiments, this additional power may help hedge trimmers get through large branches, help chainsaws avoid stalls, and even improve trigger response by allowing for motor accelerations that would otherwise be impossible to achieve within a continuous power limit.

FIG. 1 is a schematic of an exemplary electric tool 100 including a control system 130, in accordance with various embodiments. Electric current may be supplied by a power supply 120, such as an A/C source from a wall socket or generator, or a battery power supply. The electrical current may be controlled and/or modulated by the control system 130. The electrical current controlled by the control system 130 may in turn be supplied to an electric motor 140, for example to provide the energy necessary to rotate the electric motor 140, and may further be controlled by a trigger or control switch 150 coupled to the control system 130. The control system 130 may determine how much current to supply to the electric motor 140, for example when running in continuous power mode and/or boost power mode. The various components of power supply 120, control system 130 and its associated components, electric motor 140, and other sensors or indicators such as load sensor 142, sensors 132, and control switch 150 may comprise an electrical path of components. These components in the electrical path and their respective current handling capacities may define the system thermal limit, as described above.

As will be described in greater detail herein with respect to FIGS. 2 and 3, control system 130 may be configured to increase (for example boost) the supply of electric current to the electric motor 140 from the power supply 120 when the electric motor 140 encounters a load and thermal parameters of the various associated electrical components of tool 100 are within a safe margin to allow for the application of the boost power mode.

Control system 130 may be implemented as one or more electronic controllers, such as a microprocessor, a microcontroller, discrete circuitry, a combination of the foregoing, or some other device offering similar functionality. Some embodiments may implement some or all of control system 130 using a field-programmable gate array (FPGA), application-specific integrated circuit (ASIC), or another similar technology. In some embodiments, control system 130 may include a computer-readable medium such as a memory storage unit containing instructions capable of being executed by a processing unit that is part of control system 130. Control system 130, as depicted in FIG. 1, should be understood as a logical block, and may, in various embodiments, may be implemented by one or more discrete modules.

Control system 130 may implement one or more actions of the operational method 200 described below with respect to FIG. 2. These actions may be implemented with respect to a given embodiment of control system 130. For example, where control system 130 includes a microprocessor or microcontroller, method 200 may be implemented in whole or in part using instructions capable of being executed by the microprocessor or microcontroller. For another example, where control system 130 is implemented using discrete components or using transistor-transistor logic (TTL), such components may be arranged to implement some or all actions of method 200. For still another example, control system 130 may use a combination of the foregoing, with some actions of method 200 implemented using a microcontroller and other actions implemented using discrete components.

In implementing the various actions of method 200, control system 130 may include one or more sensors 132 arranged and configured to monitor and/or assess various parameters of the system. In some embodiments, sensor 132 may be a temperature-sensing device such as a thermistor, thermocouple, or similarly suitable temperature sensor. In other embodiments, such as where a correlation between current amount and component temperature is established, sensor 132 may be a current sensor. Multiple sensors 132 may be employed to monitor various discrete components of tool 100, with the multiple sensors 132 being of the same or different types. For example, in an embodiment where tool 100 is battery-powered, control system 130 may include a sensor 132 to monitor the temperature of the battery of power supply 120, another sensor 132 to monitor the current from power supply 120, a sensor 132 to monitor the temperature of an electronic speed control (ESC) 134, and a sensor 132 to monitor the temperature of electric motor 140. Depending upon the nature of tool 100, the possible environments of its intended use, and the thermal limits of the various components, yet another example may include a sensor 132 to monitor ambient temperature.

Electric motor 140 may be any motor suitable to operate within tool 100 for tool 100's intended use. Suitable motor types may include induction motors, universal motors, brushed motors, brushless motors, or any other type now know or later developed that is useful to the intended purposes of tool 100. Electric motor 140 may be supplied power by ESC 134, which may be implemented using technology suitable for delivering and modulating power to electric motor 140 in a manner appropriate to the type of electric motor 140. The ESC 134 may be integrated into or a part of control system 130, as depicted in FIG. 1, or may be a separate, discrete component in communication or under the direction of control system 130. In some embodiments, ESC 134 may be separate from control system 130 while implementing at least a part of method 200, with other actions of method 200 being implemented in whole or in part by control system 130. In various embodiments, electric motor 140 may be mechanically coupled to a driven element to supply power for tool 100 to perform work.

Load sensor 142 may be coupled to electric motor 140, control system 130, and/or a driven element of tool 100. In one possible embodiment, load sensor 142 may be implemented as, or part of, a tool speed sensor. An overload situation may be detected by a reduction in tool speed that a user has not commanded, e.g. the user continues to request the same or an increasing power level via control switch 150. For example, where tool 100 is a chainsaw and load sensor 142 is coupled to a driven element such as a chain drive sprocket, load sensor 142 may monitor the sprocket's RPMs. The user may request a target motor RPM in the 100 to 10000 RPM range, but due to external loading combined with continuous current limits, the controller may only be able to maintain a motor speed less than 95% of the target speed. Alternatively, load sensor 142 may be coupled to electric motor 140, where it can measure electric motor's 140 speed. In another example, load sensor 142 may be coupled to the power leads to electric motor 140 and be configured to monitor the current draw of motor 140. In such a configuration, an increasing load on tool 100 may result in a rising current draw, thus indicating the state of the tool 100 loading.

Load sensor 142 may be implemented using any technology suitable to monitor the selected measure of loading. For example, load sensor 142 may be a hall effect sensor or optical detector, configured to determine rotational speed. In another example, load sensor 142 may be implemented as a rotary encoder. In yet another example, load sensor 142 may be implemented as an inductive coil for monitoring current draw. In still another example, load sensor 142 may be implemented as a strain gauge or similar device for measuring deflection of a shaft or other driven component in response to loading. Other embodiments may use other suitable sensor technologies now known or later developed.

Although depicted as being disposed about electric motor 140, in some embodiments, load sensor 142 may be a part of control system 130. In particular, load sensor 142 may be a part of or comprise a sensor 132, as discussed above. In other embodiments, load sensor 142 may be a part of ESC 134.

Depending upon the nature of tool 100, trigger or control switch 150 may be implemented as a simple on/off toggle where the tool is expected to generally operate at a fixed or constant speed. Other embodiments may implement control switch 150 as a variable trigger, allowing a user to modulate the power delivered by tool 100 between off and full speed. Variable triggers may be implemented with a variety of devices, depending upon the nature of control system 130. For example, control switch 150 may be a potentiometer to vary the voltage potential or flow of current, or a position encoder, where the sensed position may translated to a corresponding current, speed, or power level by control system 130. In still other embodiments, control switch 150 may incorporate a step, toggle, or a second switch to enable a user to manually switch tool 100 from continuous power to a boost power mode, as will be described herein.

Figure 2:
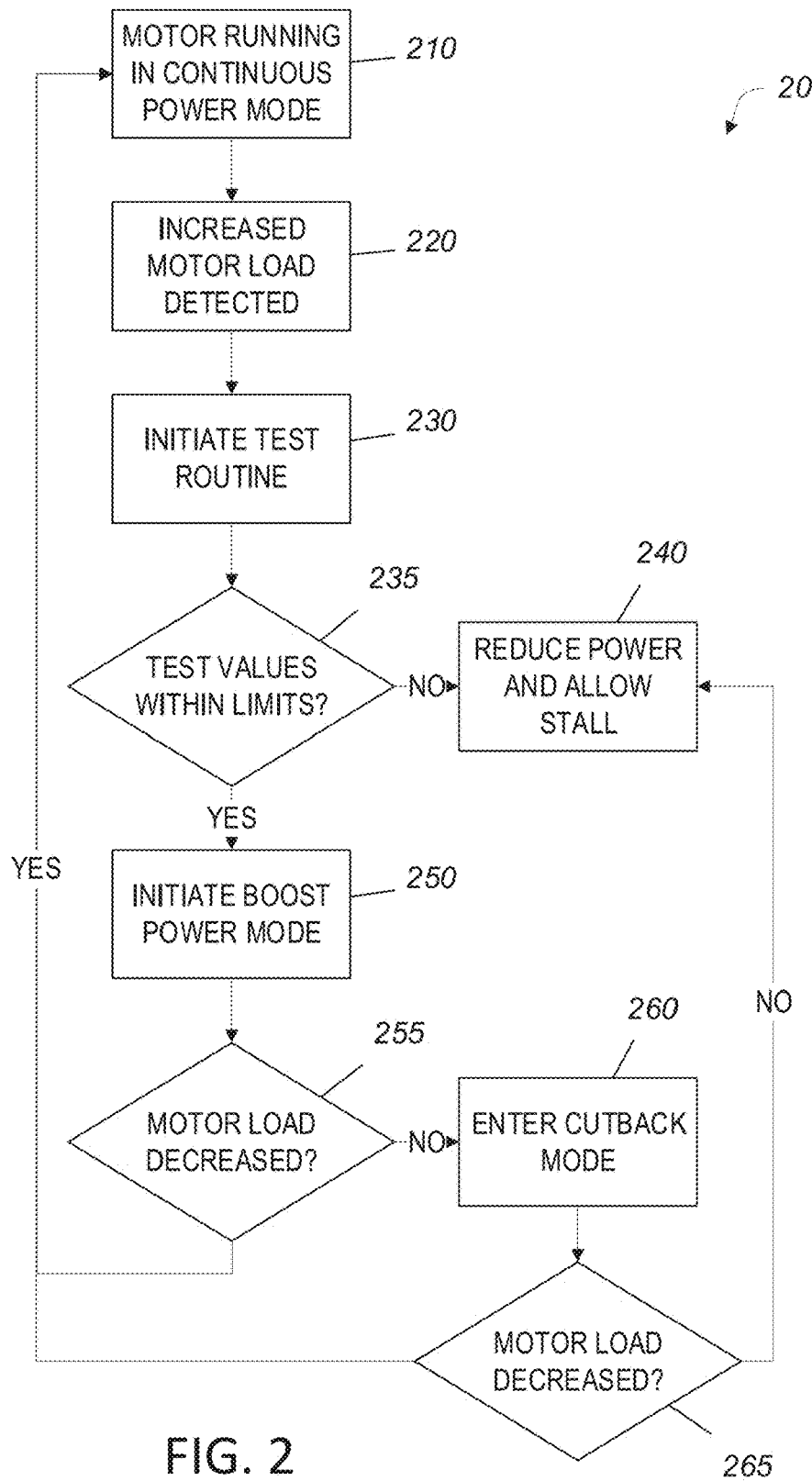
FIG. 2 is a flowchart showing a method for power modulating control of a motor that may be implemented by a control system of the electric power tool of FIG. 1, in accordance with various embodiments.

FIG. 2 is a flowchart showing an exemplary operational method 200 that may be implemented in whole or in part by a control system 130 depicted in FIG. 1 and/or some other component of tool 100, in accordance with various embodiments herein.

At block 210, following activation of tool 100, control system 130 may drive electric motor 140 in continuous power mode. In continuous power mode, control system 130 limits the delivery of power and current to electric motor 140 to a level that ensures that the system thermal limit, defined above as the continuous current limit the various components of the tool 100's electrical path can handle to continuously dissipate generated heat, is not exceeded. Depending on the nature and use or loading of tool 100, control system 130 may deliver a variable amount of power from zero (shut-off) up to the continuous current limit. Some embodiments, such as where tool 100 may be used in an environment with extreme temperature ranges, may limit the maximum current in continuous power mode to some amount less than the actual continuous current limit of the electrical path, to provide a safety margin to prevent unintended excursions past the system thermal limit. Other embodiments may use sensors 132, possibly including a sensor 132 to measure ambient temperatures, to dynamically determine the continuous current limit based upon the impact of the ambient temperature on the ability of the various components to continuously dissipate heat.

Still other embodiments may vary the continuous current limit based upon the nature of power supply 120. For example, where power supply 120 is implemented as a battery pack, the state of charge and capacity of the battery pack may influence the amount of power that can be delivered. Depending upon the nature of the battery pack, drawing excessive current may damage the pack, and so control system 130 may be configured to set the continuous power limit to not exceed the capabilities of the battery pack.

As will be recognized by a person skilled in the relevant art, the maximum delivered power in continuous power mode is less than the absolute maximum power the motor 140 is capable of running. In one respect, the absolute maximum power the motor 140 is capable of running may be defined as the maximum current the motor 140 could draw while still turning, viz. the current draw just prior to a stall at full power. In many embodiments, this power level is above the maximum continuous power limit.

At block 220, one or more sensors, such as load sensor 142, coupled to the control system 130 may detect an increase in load to the motor that may be above what the electrical path components can handle at the continuous current limit, for some embodiments, or for other embodiments, above some other predetermined threshold. In embodiments and depending upon the nature of tool 100, use of tool 100 will naturally present a fluctuating load. In many cases, tool 100 will be capable of handling this load increase within the continuous current limit, and so an increasing load will cause control system 130 to provide more power but without exceeding the continuous current limit, or some lower threshold that may be set as described above with respect to block 210.

If the load increases to the point where control system 130 cannot provide sufficient power to handle the load without exceeding the continuous current limit or some lower predetermined threshold, method 200 proceeds to block 230 where a boost power mode may be initiated, as will be described further below with respect to the following blocks. In embodiments, this predetermined threshold may or may not be coincident with the continuous current limit or a lower limit established to provide a safety margin, as described above.

At block 230, implementing control system 130 may initiate a test routine to determine if it is safe to switch the motor 140 into boost power mode. Because boost power mode results in power (and current) being delivered through the electrical path to motor 140 that may exceed the system thermal limit, the application of boost power mode may only be initiated if the motor 140 and/or other electrical path components are running within parameters such that the motor 140 and/or other components would not be damaged by such an increase in power and associated current supplied to the motor 140. As described above, the primary limiting factor may be the capacity of the components to dissipate generated heat and the speed at which undissipated heat builds up during boost power mode. Tied to these factors is the amount of power beyond the continuous power limit that boost power mode enables, and how long boost power mode is enabled.

Actions in block 230 may include a system check to determine if the thermal parameters are within the predetermined limits that allow for application of a boost power mode. An implementing control system 130 may collect measurements from one or more sensors 132 to determine a current thermal state of the various components of the electrical path and motor 140. Where sensors 132 measure temperatures, this data may be used directly. In embodiments where sensors 132 measure current flow, this data may be used to derive temperature headroom for the electrical path components.

At block 235, the control system checks whether the results of the thermal parameter check from block 230 are within normal limits, or otherwise indicate that the electrical path components have sufficient thermal headroom to accommodate a heat buildup from the excess current provided during the boost power mode. If yes, method 200 may proceed to block 250, where boost power mode is initiated. In some embodiments, whether the electrical path components have sufficient thermal headroom may be determined by a pre-established threshold. In other embodiments, whether any available or sensed thermal headroom is sufficient to allow entry into boost power mode in block 250 may depend upon the particular readings from sensors 132 in conjunction with ambient temperatures. In still other embodiments, readings from sensors 132 and available thermal headroom may be used not only to determine whether boost power mode may be safely entered, but also to determine the duration allowed for boost power mode and/or the amount of additional power available under boost power mode. For example, a thermal headroom of 0 to 150° C. may correspond to power increases of 0 to 200% over continuous limit for durations of 0 to 10 seconds.

If the results of block 235 indicate that there is insufficient thermal headroom to proceed to block 250, method 200 may proceed to block 240 in some embodiments. In block 240, the control system 130 may discontinue or reduce power to the electric motor 140. This may prevent and/or reduce the possibility of motor and/or system damage, for example from overload or shorting out. Control system 130 may remain in block 240 and shut down to allow tool 100 to dissipate built-up heat. In various embodiments, control system 130 may remain shut down in block 240 until a predetermined timer elapses and/or sensors 132 indicate that the tool 100's thermal conditions have returned to an operable condition. In some embodiments, control system 130 may additionally or alternatively require the tool user to first release trigger 150 before allowing the tool 100 to restart.

In other embodiments and/or possibly depending upon the amount of thermal headroom determined in block 230, control system 130 may reenter continuous power mode in block 210, instead of block 240. For example, control system 130 may be configured to determine whether to proceed to block 240, and shut down, or reenter block 210, and continuous power mode, based upon whether sensors 132 indicate that tool 100 is approaching an overload condition.

If the results of the tests of blocks 230 and 235 are successful, the control system 130 may initiate a controlled boost power mode at block 250. In some embodiments, after switching from the continuous power mode to the boost power mode, control system 130 may be configured to not switch back into continuous power mode for a predetermined period of time, for example, a time selected from a range from 100 ms to 10 seconds. This delay or lock-out may prevent or reduce unnecessary or frequent cycling between modes. The control system 130 may also be configured to prevent re-entering boost mode from continuous mode for a predetermined period of time, for example, 100 ms to 10 s.

It will be appreciated that, in various embodiments, the length of the predetermined time may be limited or otherwise upon a number of factors. Such factors may include: the amount of thermal headroom determined from blocks 230 and 235, where a greater amount of headroom would allow for a greater predetermined time; and, the degree to which the available power in boost power mode exceeds the available power in continuous power mode, where a greater boost power may require a shorter predetermined time. In other embodiments, the various factors may be utilized by a control system 130 to determine the predetermined time. In still other embodiments, the predetermined time may be determined by control system 130 each time boost power mode is entered in block 240 on the basis of the various factors.

Additionally or alternatively, the method 200 may include, when it is determined that the load has exceeded the pre-determined threshold in block 220 for entering boost power mode, delaying initiating boost power mode unless the load has crossed the threshold for a specified period of time, for example, a time selected from a range from 100 ms to 10 seconds. This delay may be useful to prevent tool 100 from entering boost power mode for very brief transient load fluctuations that quickly subside, and entering boost power mode would be of limited benefit. Such a delay may also help to keep boost power mode available for more substantial transient load spikes where boost power mode would prove beneficial, where engaging boost power mode would otherwise result in a delay or lockout of entering boost power mode upon return to continuous power mode. Such a predetermined period of time may even be employed in embodiments where boost power mode is otherwise locked out using sensors such as a temperature sensor.

Other embodiments may utilize feedback, such as a temperature sensor, to determine when the components have cooled sufficiently. This later approach may be particularly useful when tool 100 may be used in environments where temperatures may appreciably vary, as the components of tool 100 may require a greater or lesser amount of time to dissipate built up heat depending upon ambient temperatures. For example, an electric chain saw may find use any time of the year. When operated on a hot summer day, components of tool 100 may require longer to dissipate heat following boost mode compared to operation during the winter. In winter, the denser cold air can more efficiently dissipate heat, and so allow control system 130 to re-enable boost mode sooner than in summer weather.

As described above, in the boost power mode, the control system 130 may supply electric current to the electric motor 140 at a level greater than the continuous operation level so as to attempt to avoid a stall situation and/or power through a high transient load, such as a small section of particularly dense vegetation (as may be encountered by a hedge trimmer or string trimmer). Because the electric motor 140 may only be run in boost power mode when deemed necessary, more efficient use of power is also made. Furthermore, the electric power tool 100 may generally run quieter, as the generally noisier boost power mode may only be used when necessary. In some embodiments, the electric power tool 100 may be a battery-operated power tool, where the power supply 120 comprises a battery. In such a case, the need to conserve electricity may be of great importance.

In other embodiments, a boost power mode could be applied to tools where the power supply is an input for electric current from an external source (such as alternating current electricity) in order to make more efficient use of the electric power provided. Additionally or alternatively, a boost power mode could allow tool 100 to briefly draw power in excess of the rated capacity of a circuit to which tool 100 is connected.

In various embodiments, the control system 130 may be configured to automatically switch between the boost power mode when there is an indication of increased motor load and the continuous power mode when there is an indication of decreased motor load. The control system 130 may automatically switch from the continuous power mode to the boost power mode when the load sensor 142 indicates that the load exceeds the predetermined threshold discussed above with respect to block 220, and possibly also to switch from the boost power mode to the continuous power mode when the load sensor 142 indicates the load is below a second predetermined threshold, as will be discussed in greater detail below. In some embodiments, the first and second thresholds are different. In other embodiments, the first and second thresholds are the same.

In some embodiments, control system 130 may allow a user to manually switch to the boost power mode, or, in other embodiments, may allow the user to choose between manual and the automatic switching described above. Manual mode may be preferable to users who want greater control over power consumption, for example, to prolong battery life or prevent repeated circuit breaker trips if tool 100 is plugged into a circuit that is shared with other appliances or tools.

Once in boost power mode in block 250, control system 130 may enable power delivery in excess of the continuous current limit, within the predetermined and/or sensed system thermal limits. In some embodiments, control system 130 may start a timer, either predetermined or set based upon sensed thermal headroom, to determine how long boost power may be safely delivered without risking damage to components of tool 100. In other embodiments, control system 130 may rely solely upon feedback from one or more sensors 132 to determine the thermal condition of tool 100 and prevent exceeding the maximum thermal limits of any of the components of the electrical path. Using sensed feedback while in boost power mode may be useful if the excess load is fluctuating or only minimally above what tool 100 can handle in continuous power mode, as boost power mode may be safely enabled for a longer period of time in such conditions, as opposed to when the load is substantially beyond what tool 100 can handle in continuous power mode.

While in boost power mode, in block 255 control system 130 may monitor the motor load, such as via load sensor 142. The load may be sensed as described above with respect to load sensor 142. In embodiments, if the load decreases to below what tool 100 can handle in continuous power mode before the predetermined timer expires and/or sensed thermal conditions indicate that boost power mode must be discontinued, control system 130 may revert back to block 210, and reenter continuous power mode. Some embodiments may also utilize feedback from sensors 132 to determine if returning to block 210 and continuous power mode is feasible. Other embodiments may utilize the predetermined threshold for entering boost power mode described above with respect to block 220. Still other embodiments may utilize a second predetermined threshold that is greater or lesser than the predetermined threshold for entering boost power mode. When a first predetermined threshold for entering boost power mode is used in conjunction with a second, lower predetermined threshold for reentering continuous mode, a hysteresis effect may be obtained whereby control system 130 helps avoid unnecessary and/or excessive toggling between continuous power mode and boost power mode when dealing with loads close to the tool 100's continuous current limit. When reverting back to block 210, as described above, control system 130 may employ a lock-out from boost power mode for a predetermined length of time and/or until sensed conditions indicate sufficient thermal headroom is present.

If, however, the load does not decrease before the predetermined timer expires and/or sensed thermal conditions indicate that boost power mode must be discontinued, in some embodiments, control system 130 may jump back to block 240 and cut power/stall the motor 140. In other embodiments, control system 130 may proceed to block 260, and enter cutback mode.

In cutback mode of block 260, control system 130 may set a cutback power level, which may be a maximum power level that is below the continuous power level. Because such a reduced power level is below the continuous power level, a reduced current flows through the electrical path components. As explained above, a reduced current from the current in continuous power mode may result in a reduction in the amount of generated heat that must be dissipated, and assist tool 100 in dissipating the stored heat resulting from boost power mode while still enabling tool 100 to continue operation, without entering block 240, possibly shutting down tool 100 and/or requiring the user to release trigger 150 to continue work. The cutback power level may be a predetermined level in some embodiments, or in other embodiments may be determined dynamically by control system 130 based upon feedback from sensors 132. In embodiments implementing the later approach, for example, the cutback power level may be set lower in instances where the electrical path components are substantially at their maximum thermal limits, and incrementally higher if there is still some remaining thermal headroom.

While in cutback power mode, control system 130 may continue to monitor the tool load in block 265, such as via load sensor 142. If the load decreases, control system 130 may revert to continuous power mode in block 210. However, if the load does not decrease, control system 130 may proceed to shut down in block 240, as described above. As with boost power mode, in some embodiments control system 130 may allow tool 100 to remain in cutback power mode for a predetermined length of time without the load decreasing before proceeding to block 240. In other embodiments, control system 130 may rely upon feedback from sensors 132 to determine if sufficient heat has dissipated in cutback mode to allow tool 100 to revert to continuous power mode, or if the tool needs to proceed to shut down in block 240.

As mentioned above, embodiments implementing cutback power mode may allow a user to continue to use tool 100 even after an overload condition without needing to shut down tool 100 or for the user to release trigger 150 and wait some time for tool 100 to cool down. For example, where method 200 is implemented in a hedge trimmer, method 200 may allow a user of the hedge trimmer to power through brief patches of thicker shrubbery. If the user pushes the tool to the limit of boost power mode, tool 100 may revert to the reduced-power cutback power mode, allowing the user to reduce load without releasing the trigger, or keep working while signaling the user to ease up cutting to allow the tool to cool. If the user keeps up aggressively loading the tool even in cutback power mode, then tool 100 may need to shut down to avoid damage.

Figure 3:
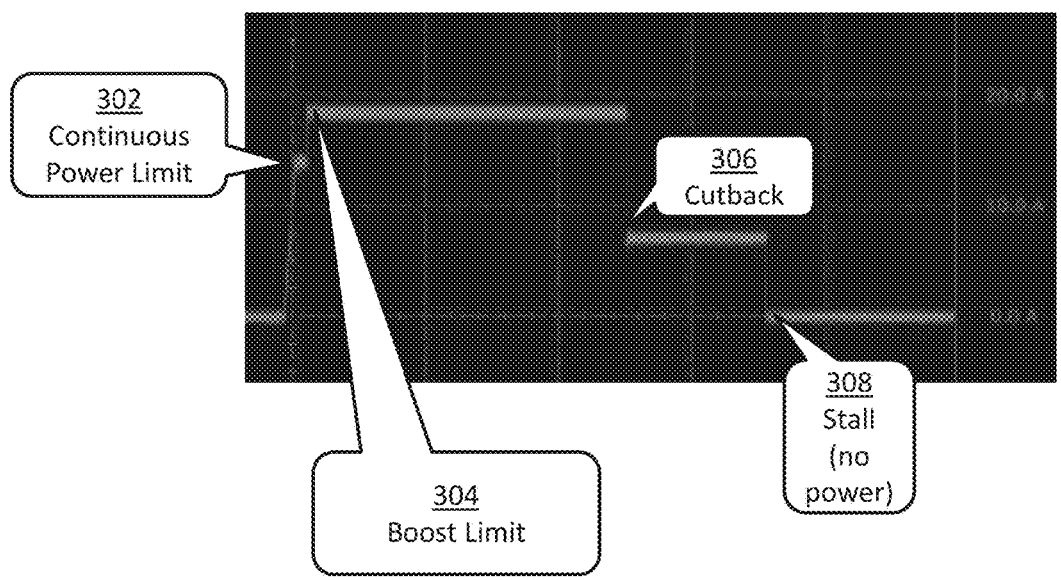
FIG. 3 is a trace of current supplied to an electric motor by a control system implementing the method depicted in FIG. 2, in accordance with various embodiments.

FIG. 3 is an example trace of the current supplied by a control system 130 implementing method 200 to a motor 140, in accordance with various embodiments. As shown in FIG. 3, a continuous power limit 302 can be set, for example at about 15.0 Amps. The amperage may be increased above the continuous power limit 302, to a boost limit 304 as control system 130 enters boost power mode, for a limited period of time as described above. In the example here, the boost limit 304 may be selected to be approximately 19 Amps, and the time limit may be 2.5 seconds. In the example shown, following boost power mode (and if the load does not decrease, as described with respect to block 255 of method 200) the amperage is reduced to a cutback level 306 which is below the continuous power level 302, to allow the components of the system to recover and/or cool. In the example here, the cutback level 306 may be selected to be approximately 8 Amps. If the load does not decrease or the control system 130 otherwise enters block 240 and shuts down, the current is reduced to the stall level 308, shown as 0 Amps, or no current flowing. Control system 130 may be configured to enter shut down if the load does not decrease after a predetermined time period, for example, approximately 1 second. As with the other parameters, this time period may vary depending upon the specifics of a given implementation.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. An electric power tool, comprising:
a control system coupled to an electric power supply and an electric motor, the control system configured to cause an electric current to be supplied to the electric motor to drive a load,
wherein:
the control system includes a continuous power mode wherein the electric current is supplied up to a first level and a boost power mode wherein the electric current is supplied up to a second level, the second level being greater than the first level,
the control system is to switch from the continuous power mode to the boost power mode when the control system senses an increase in the load past a predetermined threshold, and is to switch from the boost power mode to the continuous power mode when the control system senses a decrease in the load, and
the control system further has a cutback power mode wherein the electric current is supplied up to a third level that is less than the first level, and is to switch to the cutback power mode if the load on the electric motor does not decrease below the predetermined threshold before a predetermined time elapses.

2. The electric power tool of claim 1, wherein the third level comprises a cut-off of the electric current, such that the control system stops supplying the electric current to the electric motor if the load on the electric motor does not decrease below the predetermined threshold before the predetermined time elapses.

3. The electric power tool of claim 1, wherein the predetermined time is a first predetermined time, and the control system is to stop supplying the electric current to the electric motor if the control system is in the cutback power mode and the load does not decrease before a second predetermined time elapses.

4. The electric power tool of claim 1, wherein:
the predetermined threshold is a first predetermined threshold,
the control system is to switch from the continuous power mode to the boost power mode when the load exceeds the first predetermined threshold, and
the control system is to switch from the boost power mode to the continuous power mode when the load falls below a second predetermined threshold.

5. The electric power tool of claim 1, wherein the control system is to switch from the boost power mode to the continuous power mode after a predetermined time interval.

6. The electric power tool of claim 1, wherein the control system senses the load on the electric motor by sensing changes in the motor speed.

7. The electric power tool of claim 1, wherein the control system senses the load on the electric motor by sensing changes in a current demand from the motor.

8. A non-transitory computer-readable medium (CRM) containing instructions that, when executed by a processor in a control system, cause the control system to:
operate a motor in a continuous power mode;
switch to operate the motor in a burst power mode upon sensing an increase in a load on the motor above a predetermined threshold;
switch back to operate the motor in the continuous power mode upon sensing a decrease in the load before a predetermined time elapses; and
switch to operate the motor in a cutback power mode if the load does not decrease before the predetermined time elapses,
wherein an electric current is supplied to the motor up to a first level in the continuous power mode, the electric current is supplied to the motor up to a second level in the boost power mode, the second level being greater than the first level, and the electric current is supplied to the motor up to a third level in the cutback power mode, the third level being less than the first level.

9. The CRM of claim 8, wherein the predetermined time is a first predetermined time, and the instructions are further to cause the control system, when in cutback power mode, to discontinue the electric current to the motor if the load does not decrease before a second predetermined time elapses.

10. The CRM of claim 8, wherein the predetermined threshold is a first predetermined threshold, and the instructions are further to cause the control system to switch back to operate the motor in the continuous power mode upon sensing a decrease in the load below a second predetermined threshold.

11. The CRM of claim 8, wherein the third level comprises a cutoff of the electric current.

12. A method for controlling a motor in an electric power tool, comprising:
operating the motor in a continuous power mode;
switching to operating the motor in a burst power mode upon detecting an increase in a load on the motor above a first predetermined threshold;
switching to operating the motor back to the continuous power mode upon detecting a decrease in the load below a second predetermined threshold; and
switching to operating the motor in a cutback power mode if the load does not decrease below the second predetermined threshold before a predetermined time elapses;
wherein an electric current is supplied to the motor up to a first level in the continuous power mode, the electric current is supplied to the motor up to a second level in boost power mode, the second level being greater than the first level, and the electric current is supplied to the motor up to a third level in cutback power mode, the third level being less than the first level.

13. The method of claim 12, wherein the load on the motor is detected by detecting a change in speed of a driven element mechanically coupled to the motor.

14. The method of claim 12, wherein the load on the motor is detected by detecting a change in the electric current supplied to the motor.

15. The method of claim 12, wherein the third level comprises a cutoff of the electric current.

* * * * *